(12) United States Patent
Elwell

(10) Patent No.: US 8,336,787 B2
(45) Date of Patent: Dec. 25, 2012

(54) SYSTEMS AND APPARATUS FOR EXPRESSING MULTIMEDIA PRESENTATIONS CORRESPONDING TO PRINT MEDIA

(76) Inventor: Sean Elwell, Woodbury, CT (US)

( * ) Notice: Subject to any disclaimer, the term of this patent is extended or adjusted under 35 U.S.C. 154(b) by 0 days.

(21) Appl. No.: 13/108,541

(22) Filed: May 16, 2011

(65) Prior Publication Data

US 2012/0018507 A1  Jan. 26, 2012

Related U.S. Application Data

(63) Continuation of application No. 11/842,567, filed on Aug. 21, 2007, now Pat. No. 7,975,928.

(60) Provisional application No. 60/839,331, filed on Aug. 22, 2006, provisional application No. 60/897,278, filed on Jan. 25, 2007.

(51) Int. Cl.
*G06K 19/06* (2006.01)

(52) U.S. Cl. ..... 235/494; 235/375; 235/486; 235/462.01

(58) Field of Classification Search .................. 235/494, 235/375, 486, 462.01
See application file for complete search history.

(56) References Cited

U.S. PATENT DOCUMENTS

| | | | |
|---|---|---|---|
| 5,502,304 A | 3/1996 | Berson et al. |
| 5,869,828 A | 2/1999 | Braginsky |
| 6,094,279 A | 7/2000 | Soscia |
| 6,141,441 A | 10/2000 | Cass et al. |
| 6,166,496 A | 12/2000 | Lys et al. |
| 6,340,868 B1 | 1/2002 | Lys et al. |
| 6,375,075 B1 | 4/2002 | Ackley et al. |
| 6,502,756 B1 | 1/2003 | Fahraeus |
| 6,548,768 B1 | 4/2003 | Pettersson et al. |
| 6,561,429 B2 | 5/2003 | Bryant et al. |
| 6,577,080 B2 | 6/2003 | Lys et al. |
| RE38,286 E | 10/2003 | Flowers |
| 6,666,376 B1 | 12/2003 | Ericson |
| 6,667,695 B2 | 12/2003 | Pettersson et al. |
| 6,674,427 B1 | 1/2004 | Pettersson et al. |
| 6,732,927 B2 | 5/2004 | Olsson et al. |
| 6,788,011 B2 | 9/2004 | Mueller et al. |
| 6,801,003 B2 | 10/2004 | Schanberger et al. |
| 6,836,555 B2 | 12/2004 | Ericson et al. |
| 6,882,338 B2 | 4/2005 | Flowers |
| 6,888,322 B2 | 5/2005 | Dowling et al. |
| 6,905,391 B2 | 6/2005 | Soto et al. |
| 6,967,448 B2 | 11/2005 | Morgan et al. |
| 7,068,262 B2 | 6/2006 | Perkins et al. |
| 7,120,386 B1 | 10/2006 | Lynch et al. |
| 7,139,523 B1 | 11/2006 | Lynch et al. |
| 7,186,003 B2 | 3/2007 | Dowling et al. |
| 7,224,348 B2 | 5/2007 | Perkins et al. |
| 7,242,152 B2 | 7/2007 | Dowling et al. |
| 7,248,239 B2 | 7/2007 | Dowling et al. |
| 7,256,554 B2 | 8/2007 | Lys |
| RE39,881 E | 10/2007 | Flowers |
| 7,281,664 B1 | 10/2007 | Thaeler et al. |
| 7,347,760 B2 | 3/2008 | Wood et al. |
| 7,374,087 B1 | 5/2008 | Edgecomb |
| 7,499,036 B2 | 3/2009 | Flowers |
| 7,553,160 B2 | 6/2009 | Wood et al. |

(Continued)

*Primary Examiner* — Allyson Trail
(74) *Attorney, Agent, or Firm* — UConn IP Law Clinic; Lily Neff; Camille Sauer

(57) ABSTRACT

A media asset system and method is provided comprising a portable reader having a sensor enabled to detect a part of a surface, with the reader having means for selecting an output action by correlating said detected part with a preselected outcome. Output also provided for presenting audio and video presentation. Output is responsive to the reader's selection of output action.

13 Claims, 5 Drawing Sheets

U.S. PATENT DOCUMENTS

| | | |
|---|---|---|
| 7,557,696 B2 | 7/2009 | Brinton et al. |
| 7,562,822 B1 | 7/2009 | Schmidt et al. |
| 7,661,592 B1 | 2/2010 | Chisholm et al. |
| 7,832,645 B2 | 11/2010 | Chen et al. |
| 7,853,193 B2 | 12/2010 | Marggraff |
| 7,916,124 B1 | 3/2011 | Wood et al. |
| 7,922,099 B1 | 4/2011 | Schmidt et al. |
| 2004/0056101 A1 | 3/2004 | Barkan et al. |
| 2009/0028382 A1 | 1/2009 | Erol |

SYSTEMS AND APPARATUS FOR EXPRESSING MULTIMEDIA PRESENTATIONS CORRESPONDING TO PRINT MEDIA

CROSS REFERENCES

This application claims the benefit of U.S. Provisional Applications 60/839,331 filed Aug. 22, 2006 and No. 60/897,278 filed Jan. 25, 2007. This application is a Continuation of U.S. non provisional application Ser. No. 11/842,567 filed Aug. 21, 2007 now U.S. Pat. No. 7,975,928. All recited applications are incorporated herein by reference in their entirety and priority is date is claimed under those applications.

FIELD OF THE INVENTION

The invention relates generally to a method for supplementing the information available in a print medium by providing access to multi-media. More particularly, the invention relates to a system which uses color coded zones in a printed surface to provide a portal to sound, video, web-based or other media. Even more particularly, the invention relates to the use of a system employing both invisible and visible printed inks and specific wavelengths of light to activate sound signals, video, and/or web-based media.

BACKGROUND OF THE INVENTION

Most printed surfaces are silent and static, i.e., they do not emit sounds or display visual information relating to the objects depicted on the surface. Examples of such surfaces include the pages of books, magazines, newspapers, board games and displays.

Audiotapes, compact discs and other media can provide an audible version of the content of books. Computer systems and programs are known to provide that content on a display. Some computer programs highlight words as they are read as well as provide an audio version of the content being highlighted. Other computer systems and programs allow a user to click on a word or image to provide additional audio and visual information relating to the content. These conventional systems, however, are not part of the actual print medium and they lack the look and feel of the print medium.

Conventional systems also exist that use a scanner or stylus to scan a printed surface imprinted with a conventional two dimensional (i.e. bar code) proprietary pattern or applied medallion. These systems, however, are not ideal for printed surfaces because they involve distracting or unattractive extraneous indicia imprinted in the printed surface.

Systems that employ optical readers or other types of detectors to detect images, symbols, and barcodes in printed materials are disclosed in U.S. Pat. No. 6,722,569. The '569 patent discloses an optical reader that determines whether a captured image on printed material is a color or photographic image or a symbol.

U.S. Pat. No. 6,375,075 discloses a symbol image sensor that includes one or more filters which remove or reduce certain wavelengths of light reflected from the symbol to create color separations at the image sensor. In the '075 patent, a comparator, such as a microprocessor, programmed general purpose computer, or digital logic circuit can determine the position and color of the various elements of the symbol based on the decoded image data produced by the sensor.

Systems have also been developed in which sound data have been encoded into a printed surface and can be extracted using readers that decode the encoded information. It is sometimes desirable to encode data, including sound data, onto a reflective print having an image, symbol or barcode. The sound data, which may be optically readable, provides information relating to the image. The sound data may be encoded onto the print so that it overlays the image, or alternatively, is encoded in a margin surrounding the image on the print. A reader is typically provided which reads the encoded data and emits sound corresponding to that data. U.S. Pat. No. 5,502,304 discloses systems wherein sound data is imprinted in the form of a machine readable code, such as a barcode, onto a still form reflection print, or, invisible ink is used to form a scanable barcode encoding sound information.

U.S. Pat. No. 6,561,429 discloses an adjustable reader and a method of reading encoded indicia on an object. The reader includes a detector for detecting the indicia and an emitter coupled to the detector for emitting a signal encoded by the indicia. The indicia of the prior art, which can be a sound indicia is formed out of an invisible dye. The sound indicia of the prior art is preferably a dye having special absorption in the infrared region or ultraviolet region of the radiation spectrum. Such a dye is selected so that the dye does not absorb or fluoresce light in the human visible spectrum, but which is visible to optical reading devices capable of illuminating the indicia with infrared or ultraviolet light. For this purpose, the dye of the prior art may be 4,4"-bis(triazin-2-ylamino)stilbene-2,2'-disulfonic acids; 2-(stilben-4-y)naphthotriasoles; or 2-(4-phenylstelben-4-yl)benzoxazoles, or other suitable dye.

Other systems which use detectors to detect and trigger the expression of encoded multimedia content, including sounds, from printed material include those disclosed in U.S. Pat. No. 6,556,690. The '690 patent discloses a system where data is encoded in an image field on a photographic print and can be reproduced as sound information.

U.S. Pat. No. 6,094,279 discloses a system and process that uses infrared dyes to integrate data, in a visually imperceptible form, into a printed color image. This system allows for encoding of voice or sound data into a still print and uses an optical reader.

Still other systems employ areas called "active colors" on the print. Active colors are colored areas that can be recognized by a detector and decoded. U.S. Pat. No. 5,869,828 discloses a color coding system for encoding information on products and other substrates where the color code is printed using single intensity colors in specific shapes that can be easily read.

U.S. Pat. No. 6,141,441 discloses a technique for decoding message data that has been encoded into a printed color image made up of small color regions called signal cells that carry the encoded message.

Printed surfaces can provide more valuable sources of information if the images can be expressed in audio, visual or other form in addition to the static image on the surface. For example, children and adults who are learning how to read could benefit from books and other print media that provide information relating to the visual images in sound and/or video form. Users who are visually impaired or have a learning disability could similarly benefit from such a system. Readers who are trying to learn a foreign language could benefit from a system that provides audio output of the print content.

The art has heretofore not provided systems which can express the visual content of the printed medium in audio, video or web-based form. A simple yet comprehensive and unobtrusive system is needed for providing audio, visual and/or other expressions corresponding to the print content.

OBJECTS OF THE INVENTION

It is a primary object of the present invention to provide a surface having visible images thereon with indicia coding for audio, visual or other media presentations and means for reading those indicia to trigger the presentations.

It is a related object of the invention to provide a user-friendly, educational or entertainment tool employing light as a means of triggering an audio presentation, web-based streaming video or flash media presentation, or other media presentations from a printed surface to enhance the educational or entertainment value thereof.

It is a further object of the invention to provide a simple, user-friendly system for detecting and triggering audio, web-based streaming video or flash media, or other media presentations encoded in a printed surface using a portable handheld device to trigger presentations encoded in different portions of the surface.

SUMMARY OF THE INVENTION

The present invention provides A media asset system and method is provided comprising a portable reader having a sensor enabled to detect a part of a surface, with the reader having means for selecting an output action by correlating said detected part with a preselected outcome. Output also provided for presenting audio and video presentation. Output is responsive to the reader's selection of output action.

DETAILED DESCRIPTION OF THE INVENTION

Figure 1A:
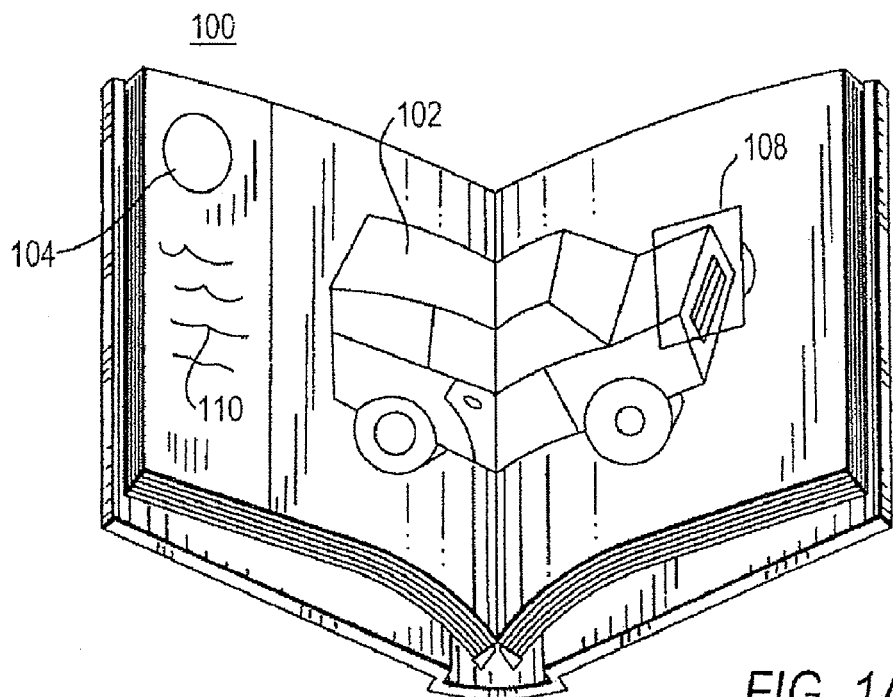
FIG. 1 is a printed page of a children's book using the present invention depicting visual information and colored zones encoding for an audio or video presentation.

The present invention is a system for activating audio, web-based streaming video, flash animation or other media presentations from a visible surface, e.g., a printed surface. The surface includes one or more visible images and one or more discrete colored zones which encode for a particular audio, video or other media presentation. As used herein the term "visual surface" may include any surface which includes one or more visual representations. Visual surfaces include, without limitation, the pages of print media, game boards, packaging, signs, exhibits or three-dimensional objects.

In an alternative embodiment of the invention, the printed surface contains a plurality of visual images and includes one or more discrete, visually colored zones which encode for a particular sound. Each of those zones are surrounded by or overlaid with an invisible substance, e.g., an invisible ink, which fluoresces when light is shone upon it. The ink is invisible to the user but can be detected when light of a certain wavelength causes it to fluoresce and the fluorescent light is detected.

The system includes a reader for triggering the presentation which comprises a light source and a light detector for detecting light reflected from one or more colored zones which code for the presentation. One preferred embodiment of this system includes a sound player which plays a sound when light is reflected from a colored zone and is detected by the detector. In an alternative embodiment of this system, the reader detects a printed color in the printed surface that codes for a web-based hyperlink. The detector of the reader sends a wireless signal to a receiver, such as a computer, to pull up a particular webpage, flash media, or streaming video content. In addition to flash media, the system can employ various types of web based media, including, but not limited to, HTML, XML, databases, JAVA and JAVA applets, Flash and other vector based graphics, rastor graphics, audio, image types including .jpeg and .gif image types, video, documents including .doc and .pdf document types, and hypertext markup languages.

The reader may comprise a flashlight-like reader capable of directing a first beam of violet light, followed by a second beam of white light, within the visible spectrum. The first beam serves to determine whether or not invisible ink is present on the printed surface. In a preferred embodiment, the first beam generates violet light of 405 nm which causes the invisible ink to fluoresce and that fluorescent light is detected. The second beam serves to establish the color value of the visible ink printed on the surface. While described for convenience as a "flashlight," the reader of the invention includes any convenient, hand-held housing which contains the several components of the triggering device.

The reader includes a light detector for detecting light of different wavelengths within the visible spectrum. A light detector functions like a color measuring chip, as it detects light fluorescing from the invisible ink when that ink is contacted by the beam on the violet edge of the visible spectrum and it detects light within the visible spectrum reflected from the visually colored zones. The reader includes a switch activated by the light detector when light is detected. If invisible ink is detected on the surface to be measured, a switch activates a processor which causes the flashlight to emit the second beam of white light. When visible light reflected from the colored zone is detected, a sound player is activated which plays a particular audible message encoded for by the colored zone.

An inner, opaque, sensor pipe curtains off ambient light and contains the light detector and sources of light. The inner pipe desirably makes even contact with the surface of the printed medium. An outer cone permits the flashlight to be centered on a visually colored zone. The outer cone desirably has a circumference such that both the visually colored area and the zone of invisible ink surrounding that zone, if any, are encompassed by the outer cone. This arrangement shields the detector from outside light and avoids a variation or fluctuation in color measurement by the sensor.

The forward part of the flashlight has a first light emitting diode for emitting a first beam of violet light, a second light emitting diode for emitting a second beam of white light and a light detector for detecting wavelengths of light reflected from the visible colored zone and emanating from the visible ink.

The forward part of the flashlight comprises an inner pipe surrounding the first light emitting diode, the second light emitting diode and the light detector. The length of the inner pipe is set to space the light detector at a predetermined distance from the colored zones so that it can accurately measure light reflected from those zones and from the invisible ink overlaid upon and/or surrounding those zones. Desirably the configuration of the opening of the pipe matches that of the colored zone so the light detector can detect essentially all of the light reflected by the colored zone at which it is directed. The forward part of the flashlight has an outer cone circumferentially surrounding the sensor pipe. The diameter of the outer cone is set so that the outer cone, and the flashlight itself, can be centered on, i.e. registered on a visually colored zone and so that the visually colored zone and the invisible ink contained within that zone, if any, are both encompassed by the outer cone.

In a preferred embodiment of the invention, the outer cone may be transparent. This will permit the user to view a message, such as a printed word, written with invisible ink within the colored zone. The user can then see and read the information displayed between the inside of the transparent cone and the outer edge of the opaque sensor pipe. To illuminate these otherwise invisible characters, the forward part of the flashlight may have third and fourth light emitting diodes which emit violet light. These are located between the inner sensor pipe and the outer cone.

The central part of the flashlight houses a first switch activated by a user. The first switch activates the first or the first, third and fourth light emitting diodes. The sensor pipe houses a second switch activated by the light detector when light emanates from the invisible ink and is detected. The switch causes the second light emitting diode to emit white light. The back part of the flashlight has a speaker which plays a sound coded for by the visually colored zone when light of a particular wavelength reflected from the visually colored zone is detected.

Figure 1B:
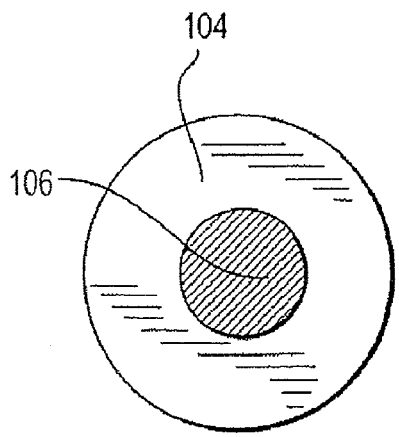
Figure 1C:
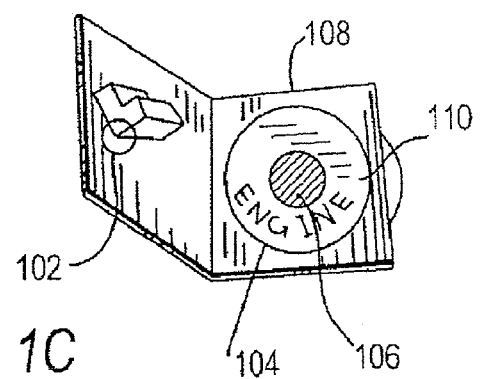

FIG. 1 depicts a page of a book for children. The page shown is printed with several images and several colored circles. The colored circles encode sounds associated with the images. These sounds are triggered by the triggering device. Page 100 includes an image of a truck or other artwork 102, text 110 and visible colored circles 104 printed by a traditional four color (CMYK) process. Colored circles 104 are surrounded by annular invisible zone 106 which is printed with invisible ink. A hinged flap 108 is also present. When the invisible ink is detected, the system for detecting and triggering a sound from visible circle 104 is activated. A hidden word 112 may be printed in invisible ink within the annular invisible zone 106. As shown, it contains a printed word.

The colored zones may be in irregular shapes rather than circles, rectangles or ellipses. All colored zones are identified as either active or inactive by the presence of absence of the invisible ink. The absence of invisible ink will prevent the detector from sensing incidental artwork as active colors which encode a presentation. The primary function of the invisible ink is error prevention but it also performs the function of adding hidden messages in the system. The hidden messages are illuminated by the violet LEDs.

Figure 2A:
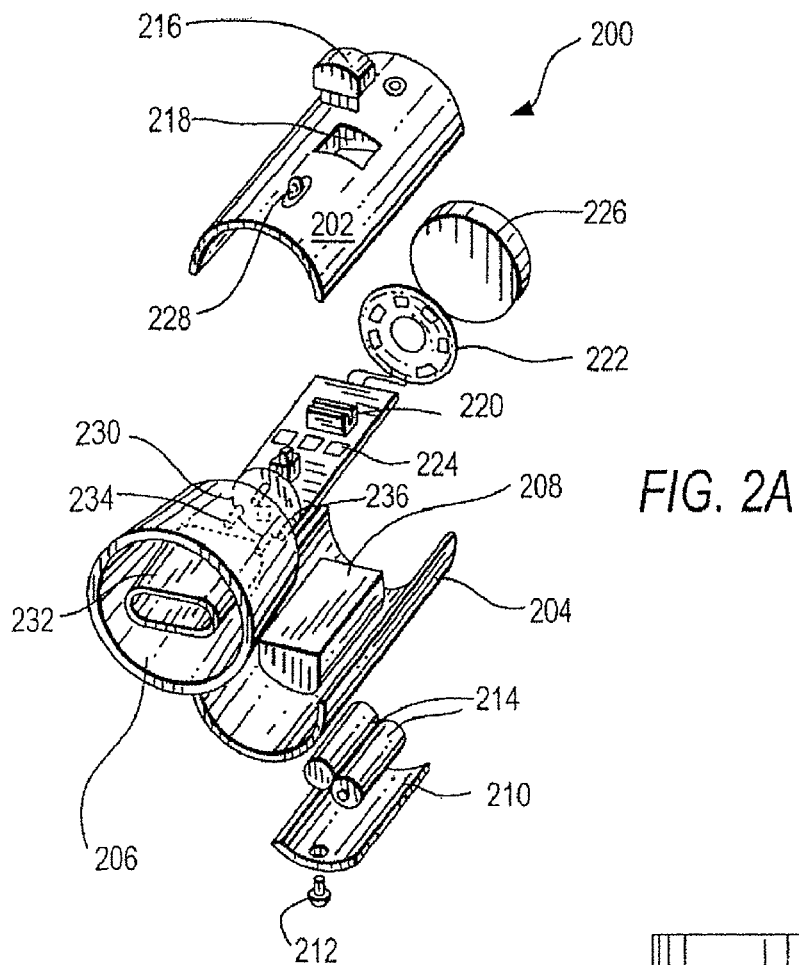
FIG. 2 is a portable, flashlight type reader of the present invention, for use in triggering audio or hyperlink-activated video presentations from colored zones on the printed page.
Figure 2B:
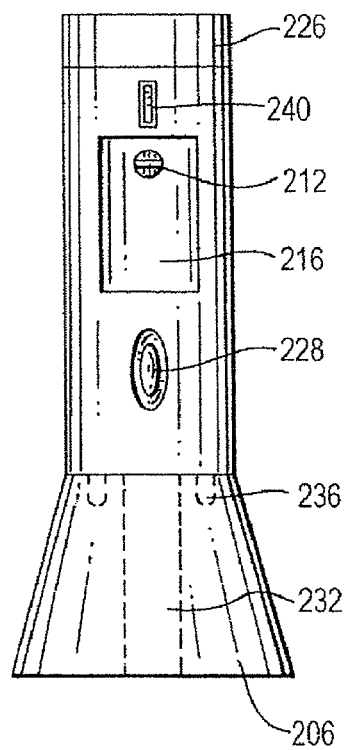
Figure 3A:
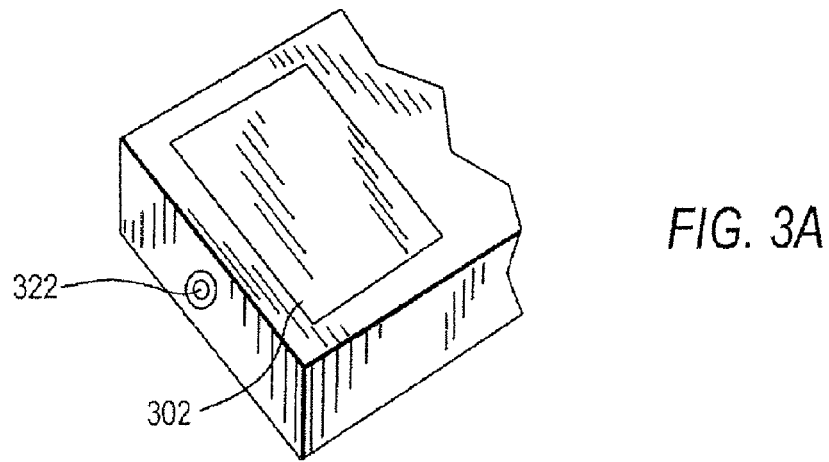
FIG. 3 is a further embodiment of the reader depicting a stylus detector for use in triggering an audio or video presentation from a visibly colored zone on the printed page.
Figure 3B:
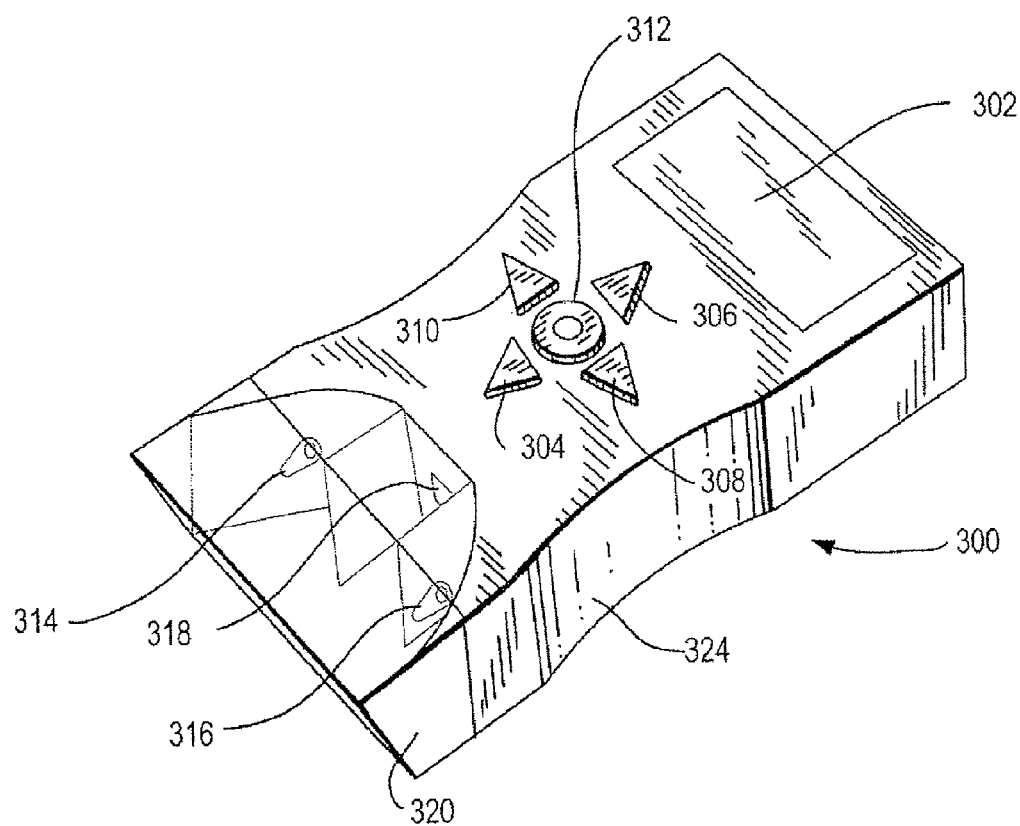
Figure 3C:
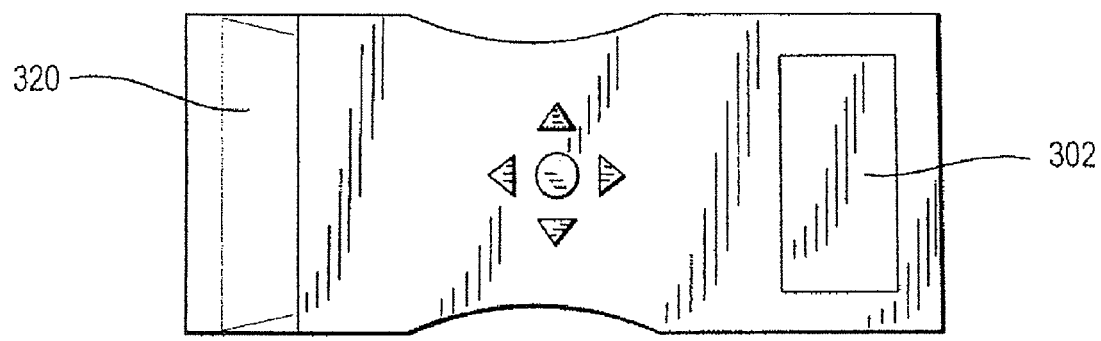
Figure 3D:
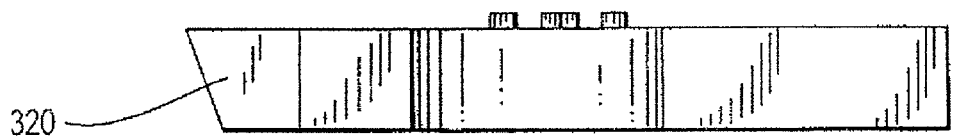
Figure 3E:
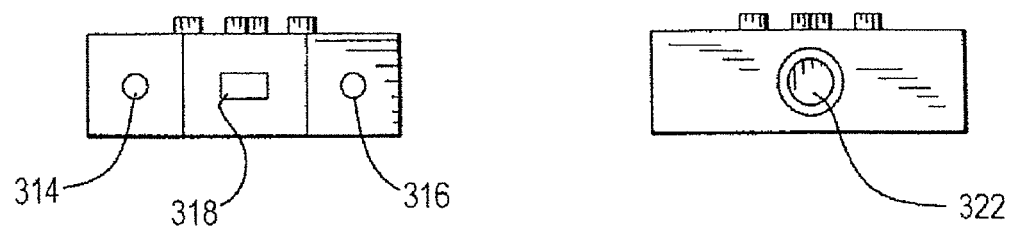
Figure 3F:
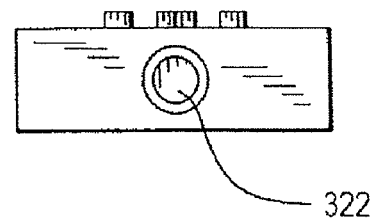

FIG. 2 illustrates a flashlight detector for use in reading educational materials. Flashlight 200 includes outer case 202 and 204 and a clear plastic cone 206. It includes battery compartment 208, battery cover 210, battery cover screw 212 and batteries 214.

Flashlight 200 includes an onboard circuit with software to measure the color values of the colored areas enclosed in embedded memory module 216 inserted into memory module slot 218. Module 216 contains stored audio files, memory module contacts 220, an onboard speaker 222 to play a specific, pre-loaded audio file. Speaker 222 is activated by FM transmitter 224 and is covered by speaker cap 226.

An LED power switch 228 is activated by the detector when violet light from the invisible medium, is detected by optical color sensor 230 within inner sensor pipe 232. The sensor is preferably a Taos 230 color sensor, which is a RGB sensor, although an equivalent RGB or CMYK sensor could also be used. LED power switch 228 causes the flashlight to emit light within the visible spectrum from white LED 234 and violet LED 236. The system plays a sound coded for by a visually colored area of FIG. 1. The sound signal is triggered when a particular wavelength of light, reflected from the visually colored area, is detected and activates switch 228.

Flashlight 200 also includes headphone jack 233 for headphones so that the reader can hear the audio signals without disturbing or distracting others. The device contains USB jack 240.

FIG. 3 illustrates a further embodiment of the invention including a stylus detector 300 for use with printed or other materials of the invention. Stylus detector 300 contains LED screen 302 where an image can be presented. The stylus contains several buttons which allow the user to direct the detector, including a next chapter button 304, a previous chapter button 306, a next track button 308, a previous track button 310 and a play/pause button 312. Stylus 300 can emit and detect light of various wavelengths. It emits light through white LED 314 and violet LED 316. It detects light in sensor 318 and sensor pipe 320. The stylus detector can be connected to headphones via headphone jack 322. The device is encased in contoured housing 324 made of plastic or other flexible material.

Figure 4:
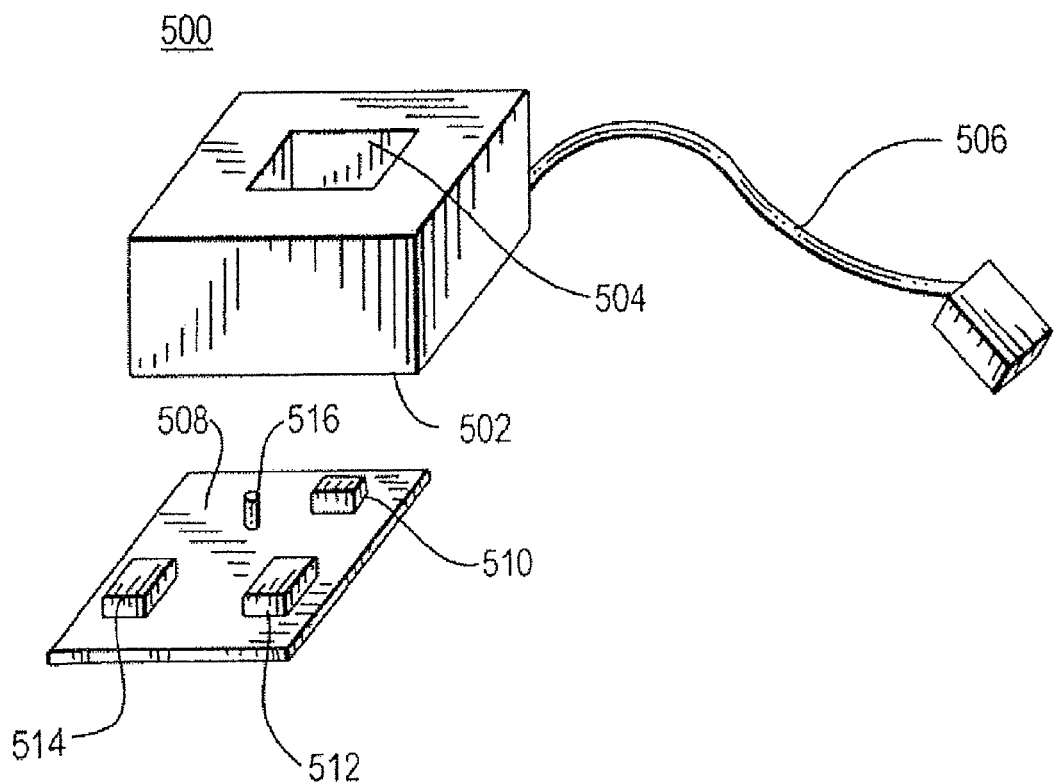
FIG. 4 is a docking station of the present invention, used in synchronizing a reader of the present invention with a computer for activation of video from hyperlinks encoded in the printed page.

FIG. 4 illustrates a docking station 500 of the present invention used in synchronizing a stylus or reader with a computer (not shown). The system depicted can detect colors on printed material that code for a web page containing streaming flash animation on a web browser. Docking station base 502 contains a well 504 for insertion of the reader or stylus. A USB cable 506 connects the base to the USB port of a computer. The system also employs a PCB 508 and a bluetooth wireless receiver 510 for detecting the signal sent from the reader or stylus after it encodes the hyperlink through wireless transmission. A processor 512 processes the hyperlink. The docking station includes power conditioner 514 and charging pin 516.

Embodiments of the invention can be used for educational and entertainment purposes. One embodiment is a book for children 2-8 years old which assists in reading or learning a language. The system will enable the user to hear associated sounds and hidden messages encoded in the printed material that are detected by the reader. The printed pages contain a layer of invisible ink on and/or surrounding colored zones on the pages which code for sounds and/or reveal hidden messages, such as the hidden word illustrated in FIG. 1.

The books may include discrete circles of solid visible colors on the pages and behind various flaps built into the pages. The circles are printed in a uniform, solid color, but each circle differs from the others in color value, and will include a layer of invisible ink on and/or surrounding the circle.

In a preferred embodiment, the layers of invisible ink are printed in circles that are approximately one half of the diameter of the visible circles. These smaller invisible ink circles are centered within the colored circles. Hidden messages can also be printed on the visible circles using invisible ink. These are printed between the outer edge of the invisible circle and the outer edge of the visible colored circle, as depicted in FIG. 1.

The invisible ink cannot be seen by the user without the reader but is detectable with the reader. If the reader detects the presence of invisible ink on and/or surrounding a visible colored circle, when the sensor of the reader is placed over the circle, the device will measure the color value of the visible colored circle. After measuring the color value of the visible circle, the reader will play a corresponding audio file associated with the color that has been measured. All audio files are stored on the flash memory chip installed in the reader prior to operation. Different flash memory chips can be provided that correspond to the various audio files contained in a particular book.

In one embodiment, when playing the sound file, the device will activate the additional 405 nm violet LEDs outside the inner tube. This violet light illuminates the hidden word or text message printed on the colored circles. As shown in FIG. 1, this word may correspond to the visible artwork on the page, as well as to the sounds that the device plays after measuring the color value.

When using the device, the user first opens the book and looks at the page. The user identifies a colored circle printed on the page. The user then places the reader onto the center of the circle so that the inner sensor tube is placed in direct contact with the colored circle. A manually operated switch built into the face of the reader activates a 405 nm violet LED in the sensor. If invisible ink is present on the surface at which the reader is directed, the invisible ink will fluoresce and light from that fluorescence will be detected by the light detector. A switch activated by the light detector will turn off the 405 nm violet LED inside the sensor and turn on the white LED inside the sensor. The violet LEDs outside the sensor and inside the outer tube will also be turned on. The color sensor then measures the visible color value of the circle. The detector and an associated processor then plays the corresponding sound file through the onboard speaker, onboard headphone jack, or external FM radio via the onboard FM transmitter, as shown in FIG. 2. The two violet LEDs activated outside the sensor pipe illuminate the hidden word written in the invisible ink.

Once the device has detected the presence of invisible ink and accurately measured the color value of the visible color, the device will play the sound to completion without interruption, even if the user removes the reader and sensor to break contact with the surface of the printed material. However, the reader will release the pressure switch built into the face of the reader if the user moves the reader to another colored circle and the presence of invisible ink is detected. The device will cease playing the audio file and will commence playing a new audio file corresponding to the new visible color measurement. If no invisible ink is detected in the new position, the device will continue to play the first audio file to completion without interruption.

In another embodiment, the invention can be used by students and adults in a modified form, as indicated in FIG. 3. The modified student/adult reader shown in FIG. 3 does not include a light cone for revealing hidden messages. However, this reader includes a multipurpose USB computer cradle, as shown in FIGS. 3 and 4. The student/adult reader additionally includes a wireless internet hyperlinking transmitter that communicates between the device and computer cradle. This cradle, shown in FIG. 4, performs three functions. First, it serves to recharge the rechargeable battery inside the reader. Secondly, the docking station cradle depicted in FIG. 4 allows for wireless reception of internet hyperlink triggers from the reader and communicates those hyperlink triggers to a computer connected to the internet via USB cable or an equivalent. Finally, the cradle serves to download new internet-based audio files into the device in a manner similar to many MP3 players known in the art.

The student/adult reader, like the child reader, detects colors printed onto the pages of text books or other printed surfaces by detecting colors of different wavelengths printed on the page. Active colors may be printed in small (¼".times.⅝") rectangles or ellipses. The shapes for these zones may be used to designate the types of medium to which it links, e.g., rectangles may play sounds, ellipses may hyperlink to web-based media, etc. The rectangles or ellipses can be covered by a layer of invisible ink to enable the device to recognize the colors as active and/or may be surrounded by a zone of invisible ink. The invisible ink may completely or partially overlay the colored zone.

The adult/child reader pulses a 405 nm violet light at the target. If invisible ink is detected, the reader measures the visible light associated with the particular color zone printed on the page. The color zones may be circles, rectangles or ellipses separated from the images on the page or may be printed in smaller color patches or included in the artwork or the text.

The light cone depicted in FIG. 2 is included with the children's embodiment. The outer tube or cone permits the child to register the reader on the color zone. The student/adult reader does not include an outer cone. It can read a color zone of any shape but the opening in the sensor tube must be large enough and configured so that it can effectively read the color zone at which it is directed.

In another embodiment, the invention can be used for entertainment purposes such as a board game. The board games are printed in a manner similar to books, and can employ either the children's or student/adult version of the reader. The board games are used like the books and are printed with both invisible and visible inks that can be detected and measured. Hidden messages in a children's version, audio messages and computer hyperlinked media in a student/adult version will direct and inform the user of the board game.

Another embodiment of the invention includes multimedia printed exhibits. The exhibits may be designed in concert with either of the two readers described. As with the board games, the exhibit is printed in advance with visible and invisible colors corresponding to specific audio or web based media.

What is claimed is:

1. A media asset system comprising:
    (a) a portable reader having a sensor enabled to detect a part of a surface; said reader having means for selecting an output action by correlating said detected part with a preselected output action;
    (b) output means for presenting audio and video presentation; said output being responsive to said reader's selection of said output action,
    (c) said surface containing a visible image and a discrete visually colored zone which codes for a particular medium of expression, said colored zone being overlaid or surrounded by a zone of an invisible fluorescent substance; and
    (d) said reader, including (i) means for directing a first beam of light capable of causing said invisible fluorescent substance to fluoresce, (ii) means for directing a second beam of light within the visible spectrum, (iii) a light detector, (iv) means activated by said light detector when light emanating from said invisible fluorescent substance is detected which causes said reader to emit said second beam of light, and, (v) means to activate a presentation coded for by the visually colored zone when light of a particular wavelength reflected from said visually colored zone is detected.

2. The system of claim 1 wherein said system is an educational entertainment system capable of activating audio, web-based streaming or vector animation presentations from designated portions of said printed surface containing visual images, and said surface contains a plurality of visible images and a plurality of discrete, visually colored zones which code for particular presentations, each of said colored zones is overlaid or surrounded by a zone of invisible fluorescent substance which can be detected by the use of light and means for detecting same; and said reader is a portable reader further comprising (i) a sensor pipe, wherein said light detector is located within said sensor pipe, (ii) a transparent outer cone surrounding said sensor pipe, and (iii) means for presenting audio, web-based or flash video presentations coded for by the visually colored zones when means to activate said presentation is enabled.

3. The system of claim 2 wherein the visually colored zone codes for an audible message and a sound player plays a sound when light reflected from the visually colored zone is reflected and detected by the detector; and said visually colored zone includes codes for a web-based hyperlink and the detector sends a wireless signal to a computer to pull up a particular webpage, flash media or streaming video content.

4. The system of claim 1 where the first beam of light is visible violet light with a wavelength at or about 405 nm.

5. The system of claim 1 where the second beam of light is visible white light.

6. The system of claim 1 where the first beam of light is visible violet light with a wavelength of about 405 nm and the second beam of light is visible white light.

7. A media asset system, comprising:
a portable reader having a sensor enabled to detect a part of a surface; said reader having means for selecting an output action by correlating said detected part with a preselected outcome;
output means for presenting audio and video presentation; said output means being responsive to said reader's selection of said output action, wherein said sensor is enabled to send and receive a light signal to a source; further comprising:
a memory having a plurality of files;
a processor in communication with said sensor so as to decode said received signal from said source, said processor also in communication with said memory such that said processor is enabled to match said decoded signal to correlating said memory file and said audio visual output is in processing communication with said processor so that an action can be initiated by said processor through said output as suggested in said correlated memory files;
said portable reader further includes means for directing beams of light and said light sensor are housed within a sensor pipe and said source is a surface, wherein the length of said sensor pipe is set to displace said light sensor from said printed surface so that it effectively reads light emanating from or reflected from said printed surface and curtains off extraneous light; and the opening of said sensor pipe matches said visually colored zone and there is an outer cone around said sensor pipe.

8. The system of claim 7 wherein said outer cone is transparent and one or more light sources are provided in an annular space defined between said sensor pipe and said outer cone.

9. The system of claim 8 wherein at least one light source within said annular source provides violet light.

10. The system of claim 9 wherein said memory is removable memory module.

11. The system of claim 10 further comprising a charger for recharging said portable reader and for alternatively downloading new audio files into said portable reader as appropriate.

12. The system of claim 11 wherein the visually colored zone codes for a web-based hyperlink and the sensor sends a wireless signal to a computer to pull up a particular webpage, flash media or streaming video content.

13. A surface including one or more visible images and one or more discrete colored zones which code for a particular medium of expression, said colored zones being capable of reflecting light within the visible spectrum in response to a directed beam of light; wherein said surface is a printed surface, including a visible image and a discrete colored zone, said zone coding for a particular medium of expression and being capable of reflecting light within the visible spectrum in response to a directed beam of light, said visually colored zone being overlaid by and/or surrounded by a zone of invisible fluorescent substance.

* * * * *